United States Patent
Ji et al.

(10) Patent No.: US 11,885,693 B2
(45) Date of Patent: Jan. 30, 2024

(54) METHOD FOR MEASURING HEAT DISSIPATION OF ELECTROMECHANICAL DEVICE

(71) Applicant: DALIAN MARITIME UNIVERSITY, Liaoning (CN)

(72) Inventors: Yulong Ji, Liaoning (CN); Chuang Liu, Liaoning (CN); Hailang Kuang, Liaoning (CN)

(73) Assignee: DALIAN MARITIME UNIVERSITY, Liaoning (CN)

( * ) Notice: Subject to any disclaimer, the term of this patent is extended or adjusted under 35 U.S.C. 154(b) by 142 days.

(21) Appl. No.: 17/578,783

(22) Filed: Jan. 19, 2022

(65) Prior Publication Data

US 2022/0136912 A1  May 5, 2022

Related U.S. Application Data

(63) Continuation-in-part of application No. PCT/CN2020/098715, filed on Jun. 29, 2020.

(30) Foreign Application Priority Data

Jul. 19, 2019 (CN) .......................... 201910656645.3
Jul. 19, 2019 (CN) .......................... 201921141609.5

(51) Int. Cl.
*G01K 17/20* (2006.01)
*G01N 25/18* (2006.01)

(52) U.S. Cl.
CPC ............. *G01K 17/20* (2013.01); *G01N 25/18* (2013.01)

(58) Field of Classification Search
CPC .............................. G01K 17/20; G01N 25/18
See application file for complete search history.

(56) References Cited

FOREIGN PATENT DOCUMENTS

| CN | 101968509 A | 2/2011 | |
|---|---|---|---|
| CN | 105928639 A | 9/2016 | |
| CN | 106556479 A | 4/2017 | |
| CN | 109769381 A | 5/2019 | |
| CN | 110274711 A | 9/2019 | |
| CN | 113945605 A * | 1/2022 | |
| CN | 107328807 B * | 4/2023 | ............. G01N 25/20 |
| DE | 3430947 A1 | 3/1986 | |

* cited by examiner

*Primary Examiner* — Mirellys Jagan
(74) *Attorney, Agent, or Firm* — NKL Law; Allen Xue

(57) ABSTRACT

A method for measuring heat dissipation of electromechanical device includes: S1. establishing a measuring apparatus; S2. measuring and obtaining data: a mass flow m corresponding to each cooling medium flowing through a housing, a temperature $T_1$ of a liquid inlet, a temperature $T_2$ of a liquid outlet, a temperature $T_3$ of an air inlet, a temperature $T_4$ of an air outlet, a temperature $T_5$ of the inside wall of the housing, a temperature $T_6$ of the outside wall of the housing, a total area A of the inside wall of the housing, and a wall thickness L of the housing are measured by the measuring elements; S3. calculating the heat dissipation. The heat dissipation of the electromechanical device under a working condition is measured so as to provide a reference for the heat dissipation design of electromechanical device.

10 Claims, 3 Drawing Sheets

METHOD FOR MEASURING HEAT DISSIPATION OF ELECTROMECHANICAL DEVICE

TECHNICAL FIELD

The present disclosure relates to the technical field of heat dissipation test, in particular to a method for measuring heat dissipation quantity of electromechanical device.

BACKGROUND

The heat dissipation of electromechanical device during operation is one of the main heat load and heat pollution in industrial production and life, which directly affects the parameters of energy consumption, refrigeration capacity and air flux of air conditioning ventilation system in relevant places, as well as the energy consumption, flow rate and pressure difference of liquid cooling system. On the other hand, the traditional electromechanical system generally uses fans for heat dissipation, which is the main noise source in device operation process, bringing many adverse effects on the physical and mental health of the production personnel working in them.

In order to reduce the energy consumption such as air conditioning ventilation system and liquid cooling system and improve the air quality of relevant working places and reduce the device noise pollution, the heat dissipation of relevant electromechanical device should become an important index in the design, assessment, and selection of electromechanical device. Hence, it is necessary to investigate the measurement and control of heat dissipation of electromechanical device that meets the higher requirements of energy conservation, environmental protection, low energy consumption, low noise, and atmospheric environmental quality in relevant operation places. The heat dissipation index should be estimated and the heat load of electromechanical device should be determined through relevant measurement tests to provide experimental data support for air conditioning ventilation system and efficient cooling solution of electromechanical device.

Therefore, a method for measuring heat dissipation of electromechanical device is urgently needed in the prior art.

SUMMARY OF THE INVENTION

According to the technical problem of the lack of a method for measuring heat dissipation of electromechanical device which have been mentioned above, the present disclosure provides a method for measuring the heat dissipation of electromechanical device. The present disclosure mainly uses that the air inlet, liquid inlet, liquid outlet, air outlet, and the inside and outside walls of the body of the measuring apparatus are respectively provided with measuring elements to calculate the sum of the heat taken away by the cooling medium and the heat of the convection and radiation heat transfer absorbed by the body of the measuring apparatus, which is the heat dissipation of the device to be measured.

The present disclosure adopts the following technical solutions for measuring heat dissipation of electromechanical device, including the following steps of:

S1. Establishing a measuring apparatus:

The measuring apparatus includes a housing. The front end of the housing is provided with a gas-tight door for the entrance and exit of the device to be measured. The inner center of the housing is provided with a device support base for carrying the device to be measured. The side wall at the bottom of the housing is successively provided with an air inlet for gas cooling medium to enter, a liquid inlet for liquid cooling medium to enter, and a liquid outlet for discharging the liquid cooling medium. The top of the housing is a gas-collecting hood with an air outlet at the top end. The air inlet, the liquid inlet, the liquid outlet, the air outlet, and the inside wall and the outside wall of the housing are respectively provided with measuring elements.

S2. Measuring and obtaining data:

The gas cooling medium flows in from the air inlet at the bottom and flows out from the air outlet at the top after flows all around the device to be measured. The liquid cooling medium flows in from the liquid inlet, and flowing out from the liquid outlet after flowing through the device to be measured. A mass flow m corresponding to each cooling medium flowing through the housing, a temperature $T_1$ of the liquid inlet, a temperature $T_2$ of the liquid outlet, a temperature $T_3$ of the air inlet, a temperature $T_4$ of the air outlet, a temperature $T_5$ of the inside wall of the housing, and a temperature $T_6$ of the outside wall of the housing are measured by the measuring elements, a total area A of the inside wall of a body of the measuring apparatus and a wall thickness L of the body of the measuring apparatus are measured.

S3. Calculating the heat dissipation:

A calculation method is as follows:

$$Q = Q_1 + Q_2$$

wherein, $Q_1$ represents the heat quantity taken away by the cooling medium calculated through the temperatures of the inlet and the outlet, $Q_2$ represents the heat quantity of the convection and radiation heat transfer absorbed by the body of the measuring apparatus.

The heat quantity of $Q_1$ taken away by the cooling medium is calculated according to the following equation:

$$Q_1 = Q_3 + Q_4$$

wherein, $Q_3$ represents the heat quantity taken away by the liquid cooling medium, $Q_4$ represents the heat quantity taken away by the gas cooling medium. The calculation equations are respectively as follows:

$$Q_3 = m_{liquid} \times c_{p,liquid} \times (T_2 - T_1)$$

$$Q_4 = m_{gas} \times c_{p,gas} \times (T_4 - T_3)$$

wherein, m respectively represents the mass flow of the corresponding cooling medium passing through the housing, $c_p$ represents a specific heat capacity of the corresponding cooling medium, $T_1$ and $T_2$ respectively represent the temperatures of the inlet and outlet under liquid cooling, and $T_3$ and $T_4$ respectively represent the temperatures of the inlet and outlet under gas cooling.

The heat quantity $Q_2$ of the convection and radiation heat transfer absorbed by the body of the measuring apparatus is calculated as follows:

$$Q_2 = k \times A \times [(T_5 - T_6)/L]$$

wherein, k represents a total heat transfer coefficient of the body of the measuring apparatus, A represents the total area of the inside wall of the body of the measuring apparatus, L represents the thickness of the body of the measuring apparatus, and $T_5$ and $T_6$ respectively represent the temperatures of the inside wall and the outside wall of the body of the measuring apparatus.

The heat dissipation Q is finally calculated.

Further, the heat dissipation Q needs to be verified under the following verification condition:

$$\frac{Q_2}{Q_1 + Q_2} \leq 5\%$$

wherein, $Q_1$ represents the heat quantity taken away by the cooling medium calculated through the temperatures of the inlet and outlet, $Q_2$ represents the heat quantity of the convection and radiation heat transfer absorbed by the body of the measuring apparatus.

The measured data of heat dissipation can be regarded as valid only if $Q_1$ and $Q_2$ meet the above equation, and the heat dissipation Q of the device can be calculated by $Q_1$ and $Q_2$. Otherwise, the operating parameters of the measuring apparatus should be adjusted to meet the above requirements, and the measuring apparatus can be debugged and checked if necessary. That is, when the above equation is greater than 5%, the mass flow of the cooling medium should be increased to enhance the effect of the cooling medium taking away the heat dissipation from the device, which is conducive to reducing the value of $Q_2$ in the above equation.

Further, the four corners of the inside wall of the housing are provided with arc-shaped guide plates.

Further, the air inlet arranged at the bottom of the housing is tangent to the arc structure of the guide plate, forming a tangential air inlet. The tangential air inlet has an inclination angle of 0° to 60° to the horizontal bottom surface and is arranged obliquely upward.

Further, the side wall of the bottom of the housing is provided with a power interface.

Further, the gas-collecting hood is a funnel-shaped structure inverted on the upper part of the housing, and the inner cavities of the housing and the gas-collecting hood form a measuring space.

Further, the housing, including the gas-collecting hood, has a three-layer structure of a metal layer, a heat insulation layer and an anti-radiation layer from the outside to the inside, respectively.

The total heat transfer coefficient of k is calculated according to the following equations:

$$\frac{L_1 + L_2 + L_3}{k} = \frac{L_1}{k_1} + \frac{L_2}{k_2} + \frac{L_3}{k_3}$$

$$L = L_1 + L_2 + L_3$$

wherein, $k_1$, $k_2$ and $k_3$ represent the heat transfer coefficient of the metal shell layer, the heat insulation layer and the anti-radiation layer of the measuring apparatus, respectively; $L_1$, $L_2$ and $L_3$ represent the thickness of the metal layer, the heat insulation layer and the anti-radiation layer of the measuring apparatus, respectively.

Further, the gas-tight door is provided with a visual window of double-layer glass.

Further, the device support base is arranged at the bottom of the housing, having a detachable galvanized grid structure.

Further, the gas cooling medium is air, and the liquid cooling medium is commonly used medium such as water, antifreeze or lubricating oil.

Compared with the prior art, the method for measuring the heat dissipation of electromechanical device of the present disclosure can measure the heat dissipation of the electromechanical device under working conditions. The housing, with the gas-collecting hood, forms an airtight chamber in which the device to be measured is placed, and the external connection is the air inlet, the liquid inlet, the liquid outlet and the air outlet. The temperatures of the air inlet, the air outlet, the liquid inlet, the liquid outlet, and the inside and outside walls of the housing are measured by the measuring elements, thereby calculating the sum of the heat quantity taken away by the cooling medium and the heat quantity of the convection and radiation heat transfer absorbed by the body of the measuring apparatus, that is the heat dissipation of the device to be measured. The method provides a reference for the heat dissipation design of electromechanical device, reduces the heat load and heat pollution of electromechanical device during operation, ensures the energy consumption of air cooling or liquid cooling design, improves the air quality in the relevant working places, and decreases the noise pollution of device.

DETAILED DESCRIPTION OF DRAWINGS

To explain the embodiments of the present disclosure or the technical solutions in the prior art more clearly, the following briefly describes the drawings required for describing the embodiments in the present disclosure or the prior art. Apparently, the drawings in the following description show some embodiments of the present disclosure, and those ordinary skilled in the art may still derive other drawings from these drawings without creative efforts.

Figure 1:
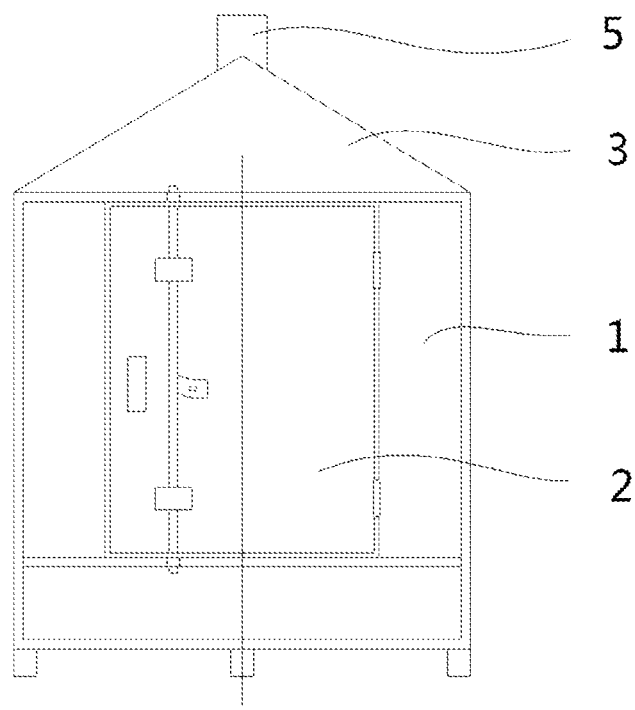
FIG. 1 is a main view of the measuring apparatus of the present disclosure.
Figure 2:
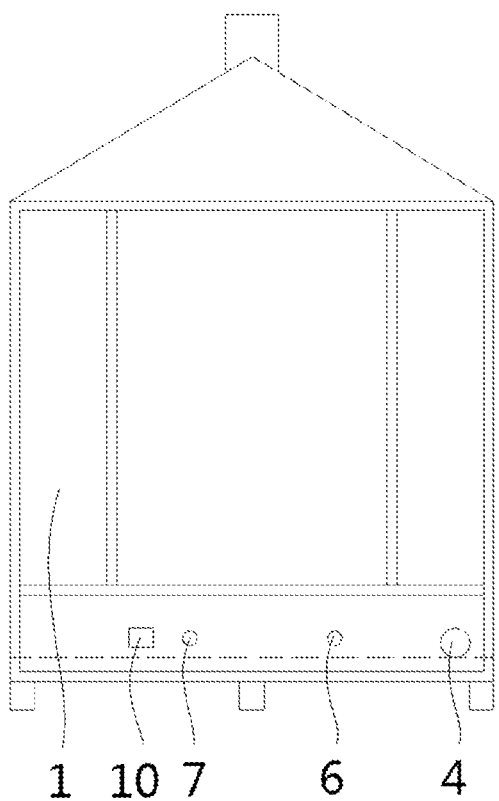
FIG. 2 is a side view of the measuring apparatus of the present disclosure.
Figure 3:
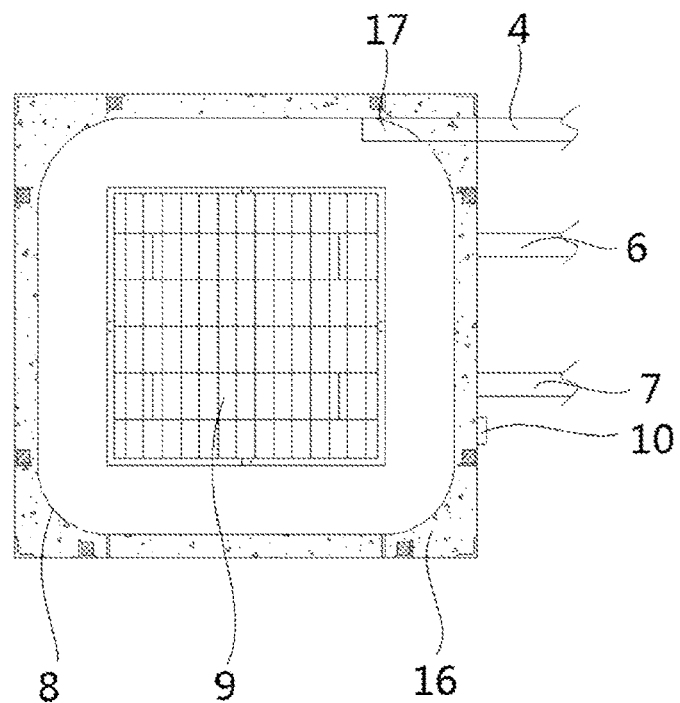
FIG. 3 is a top view of the interior structure of the measuring apparatus of the present disclosure.

In the figures: 1. housing, 2. gas-tight door, 3. gas-collecting hood, 4. air inlet, 5. air outlet, 6. liquid inlet, 7. liquid outlet, 8. guide plate, 9. device support base, 10. power interface, 11. first measuring element, 12. second measuring element, 13. pipe attachment, 14. cooling medium, 15. device to be measured, 16. heat insulation layer, 17. tangential air inlet.

DETAILED DESCRIPTION OF PREFERRED EMBODIMENTS

It should be noted that, in the case of no conflicts, the embodiments and the features in the embodiments of the present disclosure can be combined mutually. The present disclosure will be described in detail below with reference to the accompanying drawings and the embodiments.

To make the objectives, technical solutions, and advantages of the present disclosure clearer, the following clearly and completely describes the technical solutions in the embodiments of the present disclosure with reference to the accompanying drawings in the embodiments of the present disclosure. Apparently, the described embodiments are merely some rather than all of the embodiments. The following description of at least one exemplary embodiment is actually only illustrative, and in no way serves as any limitation on the present disclosure and its application or use. Based on the embodiments of the present disclosure, all the other embodiments obtained by those of ordinary skill in the art without inventive effort are within the protection scope of the present disclosure.

It should be noted that the terms used herein are only intended to describe specific embodiments and are not intended to limit the exemplary embodiments of the present disclosure. As used herein, unless indicated obviously in the context, a singular form is intended to include a plural form. Furthermore, it should be further understood that the terms "include" and/or "comprise" used in this specification specify the presence of features, steps, operations, devices, components and/or of combinations thereof.

Unless specifically stated otherwise, the relative arrangement of components and steps, numerical expressions, and numerical values set forth in these embodiments do not limit the scope of the present disclosure. In addition, it should be clear that, for ease of description, sizes of the various components shown in the accompanying drawings are not drawn according to actual proportional relationships. Technologies, methods, and devices known to those of ordinary skill in the relevant fields may not be discussed in detail, but where appropriate, the technologies, methods, and devices should be considered as a part of the authorization specification. In all the examples shown and discussed herein, any specific value should be interpreted as merely being exemplary rather than limiting. Therefore, other examples of the exemplary embodiment may have different values. It should be noted that similar reference signs and letters represent similar items in the accompanying drawings below. Therefore, once an item is defined in one accompanying drawing, the item does not need to be further discussed in a subsequent accompanying drawing.

In the description of the present disclosure, it should be noted that orientations or position relationships indicated by orientation terms "front, rear, upper, lower, left, and right", "transverse, vertical, perpendicular, and horizontal", "top and bottom", and the like are usually based on orientations or position relationships shown in the accompanying drawings, and these terms are only used to facilitate description of the present disclosure and simplification of the description. In the absence of description to the contrary, these orientation terms do not indicate or imply that the apparatus or element referred to must have a specific orientation or be constructed and operated in a specific orientation, and therefore cannot be understood as a limitation on the protection scope of the present disclosure: orientation words "inner and outer" refer to the inside and outside relative to the contour of each component.

For ease of description, spatially relative terms such as "on", "over", "on the upper surface", and "above" can be used here to describe a spatial positional relationship between one device or feature and another device or feature shown in the figures. It should be understood that the spatially relative terms are intended to include different orientations in use or operation other than the orientation of the device described in the figure. For example, if the device in the figure is inverted, the device described as "above another device or structure" or "on another device or structure" or "on another device or structure" is then be positioned as being "below another device or structure" or "beneath a device or structure". Therefore, the exemplary term "above" can include both orientations "above" and "below". The device can also be positioned in other different ways (rotating by 90 degrees or in another orientation), and the spatially relative description used herein is explained accordingly.

In addition, it should be noted that using terms such as "first" and "second" to define components is only for the convenience of distinguishing the corresponding components. Unless otherwise stated, the foregoing words have no special meaning and therefore cannot be understood as a limitation on the protection scope of the present disclosure.

As shown in FIGS. 1 to 5, the present disclosure provides a method for measuring heat dissipation of electromechanical device, including the following steps of:

S1. Establishing a measuring apparatus:

The measuring apparatus includes a housing 1, a gas-tight door 2, a gas-collecting hood 3, an air inlet 4, an air outlet 5, a liquid inlet 6, a liquid outlet 7 and a device support base 9. The front end of the housing 1 is provided with the gas-tight door 2 for the entrance and exit of the device to be measured 15. The inner center of the housing 1 is provided with the device support base 9 for carrying the device to be measured 15. The side wall at the bottom of the housing 1 is successively provided with the air inlet 4 for gas cooling medium to enter, the liquid inlet 6 for liquid cooling medium to enter, and the liquid outlet 7 for discharging the liquid cooling medium. The top of the housing 1 is the gas-collecting hood 3 with the air outlet 5 at the top end. The air inlet 4, the liquid inlet 6, the liquid outlet 7, the air outlet 5 and the inside and outside wall of the housing 1 are respectively provided with measuring elements. The measuring elements are pressure sensor and temperature sensor.

S2. Measuring and obtaining data:

During the measuring process, the device to be measured 15 is arranged on the device support base 9. The gas cooling medium flows in from the air inlet 4 at the bottom of the apparatus and flows all around the device to be measured 15 (i.e. the measured electromechanical device), then the gas cooling medium is collected by the gas-collecting hood and finally flows out from the air outlet 5 at the top of the apparatus. The liquid cooling medium flows in from the liquid inlet 6 and flows out from the liquid outlet 7 after flowing through the device to be measured 15. The mass flow m corresponding to each cooling medium flowing through the housing, the temperature $T_1$ of the liquid inlet, the temperature $T_2$ of the liquid outlet, the temperature $T_3$ of the air inlet, the temperature $T_4$ of the air outlet, the temperature $T_5$ of the inside wall of the housing and the temperature $T_6$ of the outside wall of the housing are measured by the measuring elements, and the total area A of the inside wall of the body of the measuring apparatus and the wall thickness L of the body of the measuring apparatus are measured.

S3. Calculating the heat dissipation:

The calculation method is as follows:

$$Q = Q_1 + Q_2$$

wherein, $Q_1$ represents the heat quantity taken away by the cooling medium calculated through the temperatures of the inlet and the outlet, $Q_2$ represents the heat quantity of the convection and radiation heat transfer absorbed by the body of the measuring apparatus.

The heat quantity of $Q_1$ taken away by the cooling medium is calculated according to the following equation:

$$Q_1 = Q_3 + Q_4$$

wherein, $Q_3$ represents the heat quantity taken away by the liquid cooling medium, $Q_4$ represents the heat quantity taken away by the gas cooling medium. The calculation equations are respectively as follows:

$$Q_3 = m_{liquid} \times c_{p,liquid} \times (T_2 - T_1)$$

$$Q_4 = m_{gas} \times c_{p,gas} \times (T_4 - T_3)$$

wherein, m represents the mass flow of the corresponding cooling medium passing through the housing, $c_p$ represents a specific heat capacity of the corresponding cooling medium, $T_1$ and $T_2$ respectively represent the temperatures of the inlet and outlet under liquid cooling, and $T_3$ and $T_4$ respectively represent the temperatures of the inlet and outlet under gas cooling.

The heat quantity $Q_2$ of the convection and radiation heat transfer absorbed by the body of the measuring apparatus is calculated as follows:

$$Q_2 = k \times A \times [(T_5 - T_6)/L]$$

wherein, k represents a total heat transfer coefficient of the body of the measuring apparatus, A represents the total area of the inside wall of the body of the measuring apparatus, L represents the thickness of the body of the measuring apparatus, and $T_5$ and $T_6$ respectively represent the temperatures of the inside wall and the outside wall of the body of the measuring apparatus.

The heat dissipation Q is finally calculated.

In one embodiment, the liquid inlet 6 and the liquid outlet 7 for the liquid cooling medium are communicated with the liquid cooling pipeline of the device to be measured 15. When the device to be measured 15 has no liquid cooling part, only the heat dissipation taken away by the gas can be calculated.

In one embodiment of the present disclosure, the heat dissipation Q needs to be verified under the following verification conditions:

$$\frac{Q_2}{Q_1 + Q_2} \leq 5\%$$

wherein, $Q_1$ represents the heat quantity taken away by the cooling medium calculated through the temperatures of the inlet and outlet, $Q_2$ represents the heat quantity of the convection and radiation heat transfer absorbed by the body of the measuring apparatus.

The measured data of heat dissipation can be regarded as valid only if $Q_1$ and $Q_2$ meet the above equation, and the heat dissipation Q of the device can be calculated by $Q_1$ and $Q_2$. Otherwise, the operation parameters of the measuring apparatus should be adjusted to meet the above requirements, and the measuring apparatus can be debugged and checked if necessary. That is, when the above equation is greater than 5%, the mass flow of the cooling medium should be increased to enhance the effect of the cooling medium taking away the heat dissipation from the device, which is conducive to reducing the value of $Q_2$ in the above equation.

In the heat balance determination of the present disclosure, each temperature is the average temperature of sampling point at same position over a period of time, which can effectively reduce the system error caused by the change of the state parameters of the measuring apparatus, and reconfirm the trust criterion equation or effective criterion equation in addition to the determination standard that the measuring apparatus reaches the heat balance. The final heat dissipation Q can be calculated by the following equation:

$$Q = Q_1 + Q_2$$

Based on the theory of heat conduction, the total heat transfer coefficient k of the body of the measuring apparatus is calculated, thereby calculating the heat absorption of the housing in the measuring process. When the equation of $$\frac{Q_2}{Q_1 + Q_2} \leq 5\%$$

is satisfied, the calculated $Q_2$ is considered to be reliable, and the measured heat quantity $Q_2$ is used to correct and compensate the heat quantity $Q_1$ measured by the measuring apparatus.

In the embodiment of the present disclosure, the four corners of the inside wall of the housing 1 are provided with arc-shaped guide plates 8. The air inlet arranged at the bottom of the housing is tangent to the arc structure of the guide plate 8, forming a tangential air inlet 17. The tangential air inlet 17 has an inclination angle of 0° to 60° to the horizontal bottom surface and is arranged obliquely upward, making the gas cooling medium spiral up around the device to be measured 15, which is conductive to the flow of the gas cooling medium and makes the measuring data more accurate. Preferably, one side of the guide plate 8 close to the air inlet 4 is provided with two quarter arc structures with R of 200 mm, and the other side close to the gas-tight door 2 is provided with two quarter arc structures with R of 150 mm. Preferably, the air inlet 4 is arranged at the bottom of the housing and tangent to the arc structure of the guide plate 8 and forms an inclination angle of 5° to the horizontal bottom surface. This inclined structure ensures the number of rotations of the gas cooling medium on the premise of ensuring the spiral up of the gas cooling medium, and enhances the heat exchange efficiency between the gas cooling medium and the device to be measured 15. Apparently, in other embodiments of the present disclosure, the inclination angle can be other options, such as 8°, 12°, 15° or 30°. On the premise of sufficient heat exchange between the gas cooling medium and the device to be measured 15, the purpose of the inclination angle is to adjust the circulation efficiency of the gas cooling medium, ensure the stability of the entrance and exit of the gas cooling medium, and improve the measuring accuracy through adjusting the inclination angle of the inlet. Apparently, in other embodiments of the present disclosure, the housing 1 is a cylindric body, which makes the cool effect of the rotation gas better. Otherwise, the housing 1 could adopt a cuboid structure, which is conducive to processing and manufacturing and saves processing cost.

The housing 1 of the present disclosure can be designed into a specified shape according to design requirements, so as to meet better cooling effect or simpler processing effect.

In the embodiment of the present disclosure, the side wall of the bottom of the housing 1 is provided with a power interface 10, which is used to ensure the operation power supply of the device to be measured 15.

In the embodiment of the present disclosure, the gas-collecting hood 3 is a funnel-shaped structure inverted on the upper part of the housing 1. The inner cavities of the housing, including the gas-collecting hood 3, forms a measuring space for the device to be measured 15. The air outlet 5 is arranged at the highest point of the gas-collecting hood 3. After spiraling up from the bottom of the housing 1 and being collected by the gas-collecting hood 3, the gas cooling medium is discharged through the air outlet 5, providing space for the flow of the gas cooling medium and ensuring the gas cooling medium smooth flow.

Preferably, the gas-collecting hood 3 is a funnel-shaped structure with a height of 300 mm, which is inverted on the upper part of the housing 1. The air outlet 5 with an outer diameter of 108 mm is arranged at the highest point of the gas-collecting hood 3. The high-temperature gas is discharged through the air outlet 5 after being collected by the gas-collecting hood 3.

In the embodiment of the present disclosure, the walls of the housing 1, including the gas-collecting hood 3, have a three-layer structure, which are respectively a metal layer, a heat insulation layer and an anti-radiation layer from the outside to the inside. The total heat transfer coefficient k is calculated according to the above equations:

$$\frac{L_1 + L_2 + L_3}{k} = \frac{L_1}{k_1} + \frac{L_2}{k_2} + \frac{L_3}{k_3}$$

$$L = L_1 + L_2 + L_3$$

wherein, $k_1$, $k_2$ and $k_3$ represent the heat transfer coefficient of the metal layer, the heat insulation layer and the anti-radiation layer of the measuring apparatus, respectively; $L_1$, $L_2$ and $L_3$ represent the thickness of the metal layer, the heat insulation layer and the anti-radiation layer of the measuring apparatus, respectively.

Preferably, the heat insulation layer 16 includes but not limit to heat insulation materials with low thermal conductivity coefficient such as polyurethane, rock wool or foam. The inner anti-radiation layer is the material with low thermal conductivity coefficient covered with anti-radiation aluminum foil on the surface. The outer metal layer is a high strength metal shell to ensure the strength of the housing.

Preferably, the heat insulation layer 16 of the housing 1, including the gas-collecting hoop 3, is polyurethane, and the inner layer is a density board covered with anti-radiation aluminum foil. Apparently, in other embodiments of the present disclosure, the heat insulation layer 16 and the inner layer can be other materials, aiming to achieve the overall heat insulation of the housing 1, including the gas-collecting hood 3, and ensure the lower conductivity of the inside wall, which can effectively reduce the error caused by the heat absorption of the device in the measuring process.

In the embodiment of the present disclosure, the gas-tight door 2 is provided with a visual window of double-layer glass, which is conductive to observing the actual effect in the measuring process.

In the embodiment of the present disclosure, the device support base 9 of a detachable galvanized grid structure is arranged at the bottom of the housing 1, which is conductive to the flow of the gas cooling medium. Apparently, in other embodiments of the present disclosure, the device support base 9 can be other structure, aiming to ensure the sufficient contact between the gas cooling medium and the device to be measured 15, to ensure the fluidity of the gas cooling medium and to improve the heat exchange efficiency.

Preferably, the device support base 9 is a galvanized grid structure of 600 mm both in length and width, and 100 mm×40 mm in length and width of the inner hole. The air at the bottom of the apparatus can flow upward through the grid, which is conducive to the circulation of internal air and the cooling of the device.

In the embodiment of the present disclosure, the gas cooling medium is air, and the liquid cooling medium is commonly used medium such as water, antifreeze or lubricating oil. Apparently, in other embodiments of the present, the gas cooling medium and the liquid cooling medium can be other components to ensure the measurement accuracy or low cost.

Figure 4:
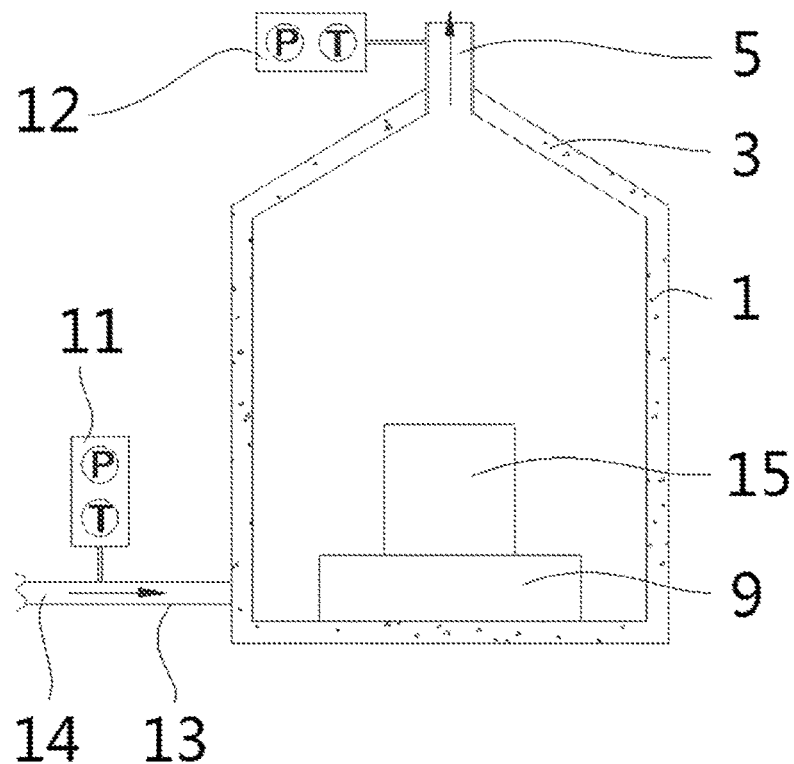
FIG. 4 is a schematic diagram of the principle of the present disclosure.
Figure 5:
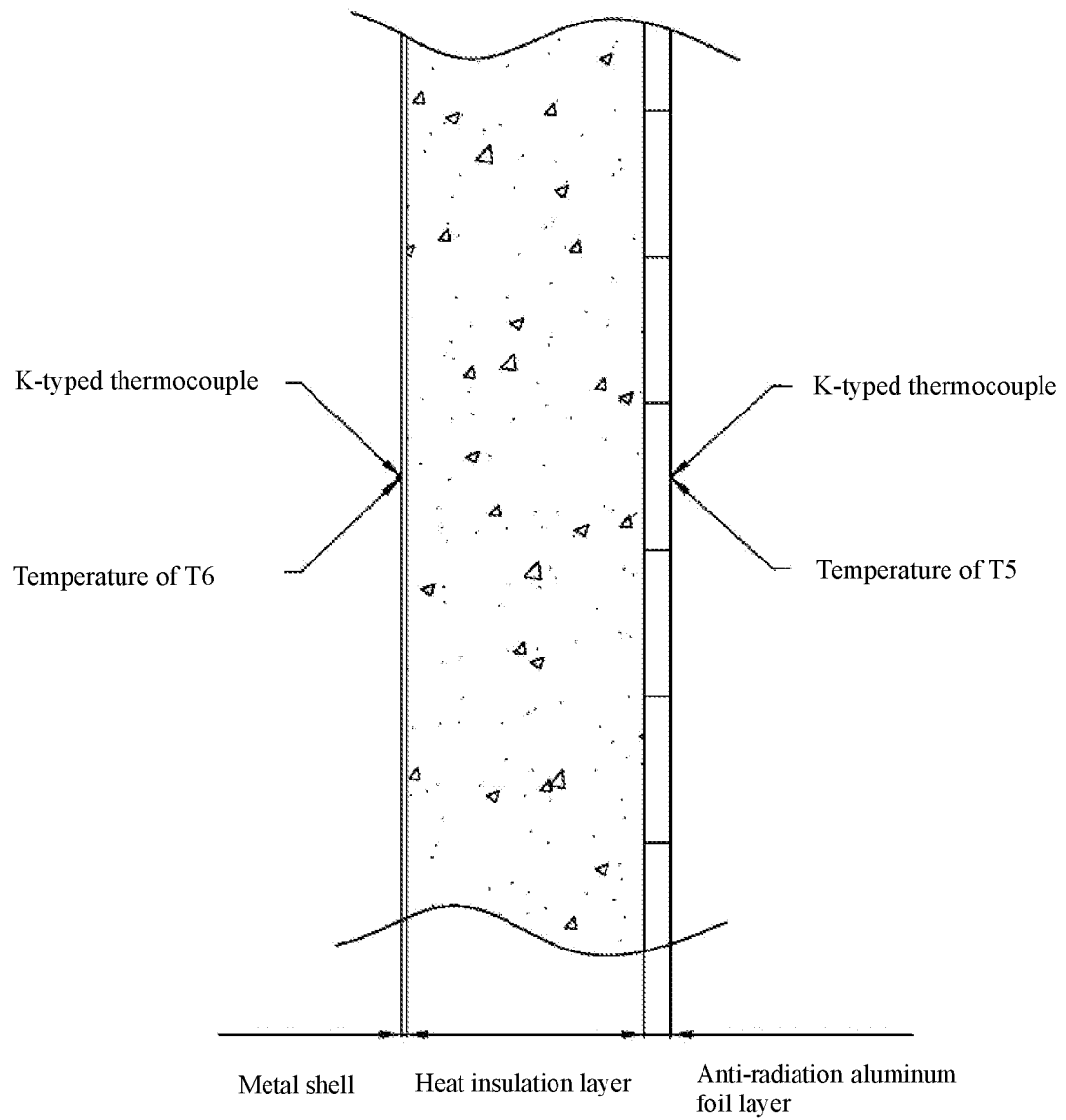
FIG. 5 is a cross-sectional schematic diagram of the housing of the present disclosure.

In the embodiment of the present disclosure, as shown in FIG. 4, the device to be measured 15 is arranged in the airtight cavity formed by the housing 1 and the gas-collecting hoop 3. The cavity is communicated with the outside through the pipeline attachment 13 with cooling medium 14, the air inlet 4, the liquid inlet 6, the liquid outlet 7 and the air outlet 5. The first measuring element 11 is used to measure the temperatures and the pressures of the liquid cooling medium of the liquid inlet 6 and the gas cooling medium of the air inlet 4, and the second measuring element 12 is used to measure the temperatures and the pressures of the liquid cooling medium of the liquid outlet 7 and the gas cooling medium of the air outlet 5, wherein the cooling medium 14 includes the gas cooling medium and the liquid cooling medium.

At last, it should be stated that the above various embodiments are only used to illustrate the technical solutions of the present disclosure without limitation; and despite reference to the aforementioned embodiments to make a detailed description of the present invention, those of ordinary skilled in the art should understand: the described technical solutions in above various embodiments may be modified or the part of or all technical features may be equivalently substituted; while these modifications or substitutions do not make the essence of their corresponding technical solutions deviate from the scope of the technical solutions of the embodiments of the present disclosure.

The invention claimed is:

1. A method for measuring a heat dissipation of an electromechanical device, comprising following steps of:
   S1. establishing a measuring apparatus,
   the measuring apparatus comprising a housing, wherein a front end of the housing is provided with a gas-tight door for entering and exiting the electromechanical device to be measured; an inner center of the housing is provided with a support base for carrying the electromechanical device to be measured; a side wall at a bottom of the housing is successively provided with an air inlet for a gas cooling medium to enter, a liquid inlet for a liquid cooling medium to enter, and a liquid outlet for discharging the liquid cooling medium; a top of the housing is provided with a gas-collecting hood with an air outlet at a top end; and the air inlet, the liquid inlet, the liquid outlet, the air outlet, and an inside wall and an outside wall of the housing are respectively provided with measuring elements;

S2. measuring and obtaining data, comprising:

flowing the gas cooling medium in from the air inlet at the bottom and flowing out from the air outlet at the top end after flowing all around the electromechanical device to be measured; flowing the liquid cooling medium in from the liquid inlet and out from the liquid outlet after flowing through the electromechanical device to be measured;

measuring a mass flow m corresponding to each cooling medium through the housing, a temperature $T_1$ of the liquid inlet, a temperature $T_2$ of the liquid outlet, a temperature $T_3$ of the air inlet, a temperature $T_4$ of the air outlet, a temperature $T_5$ of the inside wall of the housing, and a temperature $T_6$ of the outside wall of the housing by using the measuring elements, and measuring a total area A of the inside wall of the housing of the measuring apparatus and a wall thickness L of the housing of the measuring apparatus;

S3. calculating the heat dissipation Q based on the equation:

$Q = Q_1 + Q_2$, wherein $Q_1$ represents a heat quantity taken away by the liquid cooling medium and the gas cooling medium, $Q_2$ represents a heat quantity of a convection and radiation heat transfer absorbed by the housing of the measuring apparatus;

the heat quantity $Q_1$ taken away by the liquid cooling medium and the gas cooling medium being calculated according to the following equation:

$$Q_1 = Q_3 + Q_4,$$

wherein $Q_3$ represents a heat quantity taken away by the liquid cooling medium, $Q_4$ represents the heat quantity taken away by the gas cooling medium, and calculation equations are respectively as follows:

$$Q_3 = m_{liquid} \times c_{p,liquid} \times (T_2 - T_1),$$

$$Q_4 = m_{gas} \times c_{p,gas} \times (T_4 - T_3),$$

wherein m represents the mass flow of the corresponding cooling medium passing through the housing respectively, $c_p$ represents a specific heat capacity of the corresponding cooling medium, $T_1$ and $T_2$ respectively represent the temperatures of the inlet and outlet of the liquid cooling medium, and $T_3$ and $T_4$ respectively represent the temperatures of the inlet and outlet of the gas cooling medium; and the heat quantity $Q_2$ of the convection and radiation heat transfer absorbed by the body housing of the measuring apparatus being calculated as follows:

$$Q_2 = k \times A \times [(T_5 - T_6)/L],$$

wherein k represents a total heat transfer coefficient of the body of the measuring apparatus, A represents the total area of the inside wall of the body of the measuring apparatus, L represents the thickness of the body of the measuring apparatus, and $T_5$ and $T_6$ respectively represent the temperatures of the inside wall and the outside wall of the housing of the measuring apparatus.

2. The method according to claim 1, further comprising:

taking the calculated heat dissipation Q of the electromechanical device as valid when $$\frac{Q_2}{Q_1 + Q_2} \leq 5\%,$$

or when $$\frac{Q_2}{Q_1 + Q_2} > 5\%,$$

increasing a mass flow of the liquid cooling medium, the gas cooling medium, or both to increase $Q_1$.

3. The method according to claim 1, wherein the side wall of the bottom of the housing is provided with a power interface.

4. The method according to claim 1, wherein the gas-collecting hood is a funnel-shaped structure inverted on the upper part of the housing, and inner cavities of the housing form a measuring space.

5. The method according to claim 1, wherein the housing walls have a three-layer structure of a metal layer, a heat insulation layer and an anti-radiation layer from the outside to the inside, a total heat transfer coefficient k is calculated according to the following equations:

$$\frac{L_1 + L_2 + L_3}{k} = \frac{L_1}{k_1} + \frac{L_2}{k_2} + \frac{L_3}{k_3},$$

$$L = L_1 + L_2 + L_3,$$

wherein $k_1$, $k_2$ and $k_3$ represent the heat transfer coefficient of the metal layer, the heat insulation layer and the anti-radiation layer of the housing walls, respectively; and $L_1$, $L_2$ and $L_3$ represent the thickness of the metal layer, the heat insulation layer, and the anti-radiation layer of the housing walls, respectively.

6. The method according to claim 1, wherein the gas-tight door is provided with a visual window of double-layer glass.

7. The method according to claim 1, wherein the electromechanical device support base is arranged at the bottom of the housing and has a detachable galvanized grid structure.

8. The method according to claim 1, wherein the gas cooling medium is air, and the liquid cooling medium is water, antifreeze or lubricating oil.

9. The method according to claim 1, wherein four corners of the inside wall of the housing are provided with arc-shaped guide plates.

10. The method according to claim 9, wherein the air inlet arranged at the bottom of the housing is tangent to the arc structure of the guide plate, forming a tangential air inlet, and the tangential air inlet has an inclination angle of 0° to 60° to a horizontal bottom surface and is arranged obliquely upward.

* * * * *